Aug. 15, 1939.  H. O. LINDGREN  2,169,263
CENTRIFUGAL SEPARATOR
Filed Sept. 7, 1935
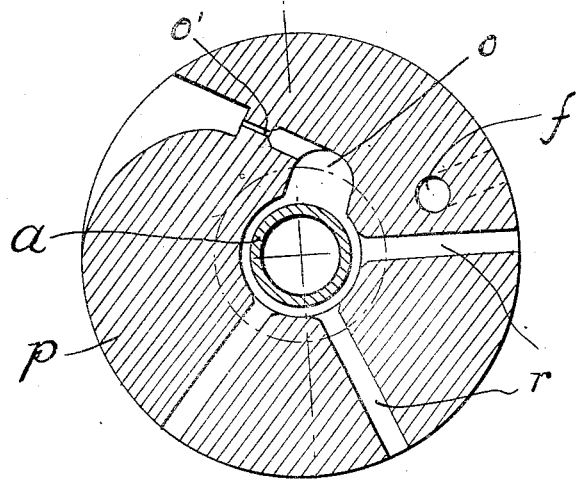
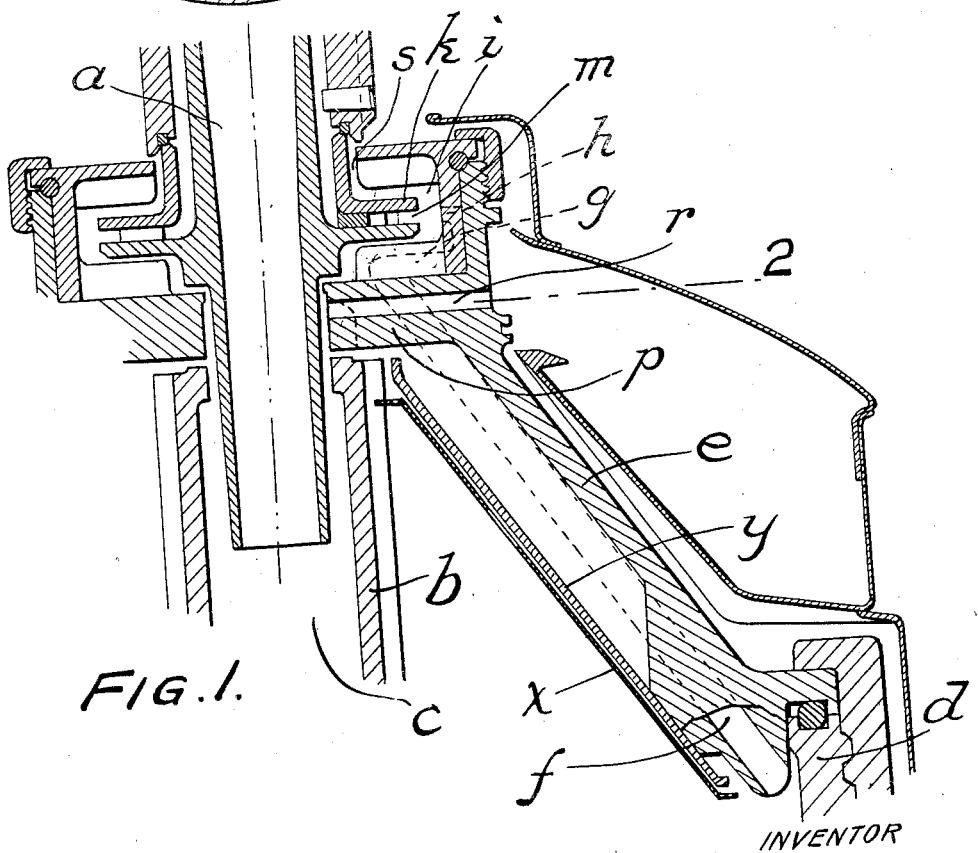
INVENTOR
Hans Olof Lindgren
BY Busen and Harding
ATTORNEYS.
WITNESS:
Rob R Mitchell Patented Aug. 15, 1939

2,169,263

UNITED STATES PATENT OFFICE 2,169,263

CENTRIFUGAL SEPARATOR

Hans Olof Lindgren, Appelviken, Sweden, assignor to The De Laval Separator Company, New York, N. Y., a corporation of New Jersey Application September 7, 1935, Serial No. 39,510
In Sweden January 21, 1935

3 Claims. (Cl. 233—22)

It is known to provide centrifugal separators with a stationary disc-shaped skimmer or parer, concentric with the axis of rotation, provided with outflow channels, having at its circumference inflow openings which project into the rotating mass of liquid. The rotating mass of liquid thus covers part of the disc adjacent its periphery. The object is to prevent air from being mixed with the liquid that streams into the disc through said channels, thereby preventing formation of froth, which, in the treatment of certain liquids, such as milk, is very objectionable. The paring device may be positioned in the separating chamber, but is preferably positioned in a special chamber rotating with the bowl and communicating with the separating space of the bowl. If the parer is intended to take out skim milk from the bowl, the special chamber is arranged to communicate with the peripheral part of the separating chamber.

A serious objection to the above described arrangement is that the pressures in the spaces at the center of the bowl and below the paring disc are subject to considerable variation which heretofore has been uncontrollable. With variations in this pressure the quantity of liquid flowing into the separator varies and the proportion of butter fat in the cream varies.

The object of my invention is to maintain a substantially constant pressure in the interior of the bowl. This is accomplished by providing an air passage or passages so arranged that the above mentioned spaces are in constant communication with the atmosphere surrounding the bowl. In its most effective embodiment, this air passage communicates also with the central receiving chamber or distributor through which the liquid to be separated is supplied to the separating space of the bowl. The invention is especially applicable to that type of separator in which the outlet for the lighter separated liquid (e. g., cream) is completely filled with such liquid so that air cannot enter therethrough.

In the drawing, which shows a preferred embodiment of the invention—

Fig. 1 is a vertical sectional view through the upper part of a centrifugal separator bowl comprising one embodiment of the invention.

Fig. 2 is a horizontal section on line 2 of Fig. 1 with parts omitted for clearness.

The liquid to be separated, for example, whole milk, flows from an overhead supply through a feed tube $a$, into the tubular shaft $b$ which encloses the central receiving chamber $c$. Through well known means (not shown) the milk flows from chamber $c$ into the separator chamber of the bowl, which is bounded interiorly by the shaft $b$ and exteriorly by the bowl wall $d$. Upon the shaft $b$ is strung a pile of discs $x$ (one of which is shown), above which is a top disc $y$. $e$ is the bowl top. $f$ is a tubular channel which may extend partly through the bowl top and partly under it and thence through the inwardly extending flange $p$ of the bowl top. This channel communicates at its lower end with the peripheral part of the separating chamber and at its upper end with a passage $g$ having orifices $h$ opening into a paring chamber $i$ carried by the bowl top and in which is stationarily located a disc-shaped parer $k$ having channels $m$ whose inlet openings are opposite the orifices $h$. The separated skim milk flows from the peripheral space of the bowl through tube $f$ and passage $g$ into the paring chamber $i$. The inner level of the liquid in chamber $i$ is inside the inlet mouths of the parer so that the latter are always immersed in the liquid. A commercial machine will be preferably provided with a number of channels $f$ and passages $g$, but in order to simplify the disclosure only one channel and one passage are shown in the drawing.

The separated cream flows upward near the inner wall of the bowl into a channel $o$ formed in the inner edge of the inwardly extending flange $p$ of the bowl top and thence is discharged outwardly through passage $o'$ formed in the flange $p$. See Fig. 2. Communicating with the inner zone of the paring chamber $i$ is an air passage $r$. This passage also communicates with the space inside the bowl top flange $p$ and inside the tubular shaft $b$ and thus with the central receiving chamber $c$ and also communicates, through the space above the upper end of the tubular shaft $b$, with the separating chamber of the bowl opposite the upflowing, outflowing stream of separated cream. Where there is an open discharge for the cream, such discharge may be given such dimensions that it will not completely fill with liquid but will leave along its inner wall a space sufficiently wide to keep the air pressure inside the bowl substantially in constant relation with atmospheric pressure.

It is important and necessary that the inner end of the air passage $r$ shall be, as shown, nearer to the center or axis of the bowl than the inner side of the annulus of liquid contained therein.

Where in the claims the interior of the bowl is specified, I mean to include the separating space of the bowl, or the space in the paring chamber nearest the separating space of the bowl (below the paring disc in the constructions described), or both.

What I claim and desire to protect by Letters Patent is:

1. A centrifugal separator comprising a rotary bowl including a bowl shell and a bowl top and provided with a separating chamber and an auxiliary chamber rotating with the bowl and communicating with the separating chamber, a stationary feed tube and attached thereto a disc-shaped paring device whose periphery is adapted to be submerged in the separated liquid in said auxiliary chamber and when so submerged exclude gaseous communication between the bowl and the atmosphere by way of said auxiliary chamber, and a central receiving chamber between the feed tube and the separating chamber, there being formed in the bowl top below said auxiliary chamber a passage whose outer end opens outside the bowl and whose inner end communicates with said auxiliary chamber, said separating chamber and said central receiving chamber.

2. A centrifugal separator comprising a rotary bowl including a bowl shell and a bowl top and provided with a separating chamber and an auxiliary chamber rotating with the bowl and communicating with the separating chamber, and a disc-shaped paring device whose periphery is adapted to be submerged in the separated liquid in said auxiliary chamber and when so submerged exclude gaseous communication between the bowl and the atmosphere by way of said auxiliary chamber, there being formed in the bowl top below said auxiliary chamber a passage whose outer end opens outside the bowl and whose inner end communicates with the space in said auxiliary chamber below the paring device and with said separating chamber.

3. A centrifugal separator comprising a stationary feed tube; a rotary bowl comprising a bowl wall and hood enclosing a separating chamber, an upstanding neck and spaced apart members extending inward from said neck, said neck forming the outer wall and said members the upper and lower walls respectively of an auxiliary paring chamber which rotates with the bowl and communicates with, and is adapted to receive one of the separated liquids from, the separating chamber; a hollow disc-shaped paring device within said paring chamber and mounted on and having its lower wall in liquid-tight relation with the feed tube, means providing a liquid discharge passage outside the feed tube and in free communication with the interior of the paring device, said paring device extending outward from said feed tube and adapted to have its periphery submerged by a rotating body of separated liquid in the paring chamber, the specified construction shutting off any gaseous communication from the interior of the bowl to the atmosphere surrounding the bowl either by way of said paring chamber or between the parer and the feed tube or by way of the parer and said liquid discharge passage, there being a special air passage in the lower wall of the paring chamber communicating at one end with the atmosphere and at the other end with the interior of the parer chamber nearer the axis of the bowl than the inner wall of the space adapted to be occupied by the body of liquid in said parer chamber.

HANS OLOF LINDGREN.